Figure 1:
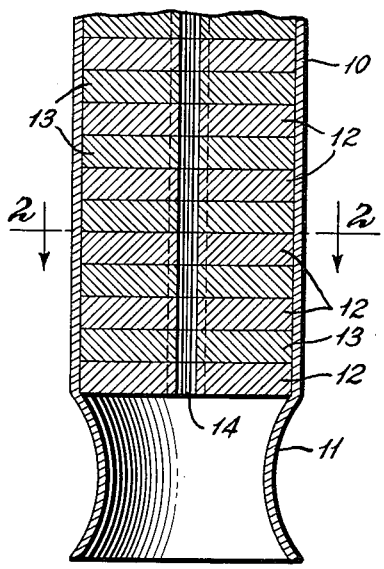

June 16, 1964     A. V. GROSSE ETAL     3,137,127

METHOD OF DEVELOPING HIGH ENERGY THRUST

Filed March 28, 1961     2 Sheets-Sheet 1

INVENTORS
Aristid V. Grosse
and Alex G. Streng
BY Burns, Doane, Benedict & Olsons
ATTORNEYS June 16, 1964  A. V. GROSSE ETAL  3,137,127
METHOD OF DEVELOPING HIGH ENERGY THRUST
Filed March 28, 1961  2 Sheets-Sheet 2

INVENTORS
Aristid V. Grosse
and Alex G. Streng
BY
Burns, Doane, Benedict & Lions
ATTORNEYS

United States Patent Office 3,137,127
Patented June 16, 1964

3,137,127
METHOD OF DEVELOPING HIGH ENERGY THRUST
Aristid V. Grosse, Haverford, and Alex G. Streng, Philadelphia, Pa., assignors to Research Institute of Temple University, Philadelphia, Pa., a nonprofit organization of Pennsylvania
Filed Mar. 28, 1961, Ser. No. 98,981
7 Claims. (Cl. 60—35.3)

This application is a continuation-in-part of application Serial Number 739,757, filed June 4, 1958, now abandoned.

This invention relates to solid high energy- bi-propellant bodies useful in rocketry. More particularly, it concerns a propellant body characterized by smooth burning characteristics and high specific impulse, which body comprises a solid fuel component and solid oxidizer component in the form of discrete juxtaposed or contiguous elements. A plurality of shaped elongate fuel elements and a plurality of elongate oxidizer elements, shaped to provide matching surfaces with the surfaces of the fuel elements, are provided. These are arranged in juxtaposed relationship with one or more surfaces of each fuel element contiguous to a matching surface of an oxidizer element, to form a composite propellant body with the solid fuel and oxidizer elements distributed therethrough, usually in a regular pattern. In transverse cross-section this presents an essentially solid surface formed by alternating transverse sections of said fuel elements and oxidizer elements. Usually at least one of said elements is a frozen, normally gaseous or normally liquid material, i.e., fluid, under atmospheric conditions, although in certain instances both may be materials which are normally gaseous or normally liquid at room temperature. The requirement is that the fuel and oxidizer is capable of being converted to a fluid form under the heat of the flame produced when the body is ignited, and melt and/or vaporize at the burning surface with sufficient ease to form a substantially uniformly mixed combustible mixture at a rate to insure a self-sustaining flame. The combination of fuel and oxidizer elements when mixed as indicated must be capable of burning with the release of large quantities of available energy, and when confined within the propellant-receiving chamber of a rocket or missile to provide a high degree of thrust.

It has been known for a long time that a chemical reaction can be prevented if one reactant is added in solid form to a second liquid reactant and that violent reaction, explosion or detonation will take place if the first reactant is warmed up to its melting point. Our invention is based on the discovery that a flame can be sustained without melting the solid matrix in front of the flame, except for the thin layer of liquid necessary to maintain the flame.

At the present time two types of propellants are employed, namely, liquid or solid. From the standpoint of performance as indicated by the theoretical specific impulse ($I_{sp}$), the presently used liquid fuel-oxidizer combinations have an advantage over the solid propellants now employed. The solid propellants have the advantage of greater volumetric efficiency. The liquid oxidizer and liquid fuel combination requires separate tanks for each, and also requires a variety of plumbing, valves and pumps, control devices, etc. for delivering the two elements to the burning zone in the proportions in which they are required to produce the combustible mixture. These constitute additional dead weight which must be propelled and furthermore take up considerable space. The solid propellants do not require such auxiliary equipment, and this tends to offset the lower volumetric efficiency of present day fuels. As a result, many of the present day rockets and missiles are designed for the use of solid fuel-oxidizer combinations rather than employing the more efficient liquid combinations with their attendant decreased pay load and increased complexity which frequently may lead to mechanical malfunctioning.

While there are a variety of conventional solid propellants which may be used a typical one is made up of intermixed granulated or powdered ammonium perchlorate milled into a solid organic-polysulfide rubber. The mixing of these particles and forming the mixture into the requisite shape for charging the rocket is dangerous since if the mixture should be accidentally ignited, disastrous explosions may result. Moreover, some of the failures of missiles propelled with such solid propellants have been due to the fact that the body exploded or detonated rather than burning uniformly to provide the requisite thrust over the period of time necessary to give the rocket its maximum velocity.

The performance data on certain present day liquid bi-propellants and of certain high energy bi-propellants have been published. The specific impulse is calculated at a standard chamber pressure of 300 p.s.i.a.

$$F = I_{sp} \times W$$

where $F$ = pounds of thrust
and $W$ = pounds of propellant burned per second.

This is done by actually measuring the thrust and the rate of propellant consumption. The specific impulse can also be calculated with sufficient accuracy for many purposes from the heats of formation of the combustion products and other thermodynamic data.

The following Tables 1 and 2 show the theoretical specific impulse at 300 p.s.i.a. in seconds of a number of fuel-oxidizer combinations, all of which are liquid bi-propellants.

TABLE 1
*Liquid Bi-Propellants Now in Use*

| Oxidizer | Fuel | Oxidizer/fuel ratio (by Weight) | $I_{sp}$ sec. at 300 p.s.i.a. |
|---|---|---|---|
| 100− HNO$_3$ | Turpentine | 4.4 | 221 |
| RFNA [1] | Ethanol | 2.5 | 219 |
| RFNA | Aniline | 3.0 | 221 |
| RFNA | Ammonia | 2.2 | 225 |
| 99% H$_2$O$_2$ | Ethanol | 4.0 | 230 |
| 99% H$_2$O$_2$ | JP-4 | 6.5 | 233 |
| Oxygen | Ethanol | 1.5 | 242 |
| Do | JP-4 | 2.2 | 248 |
| Do | Turpentine | 2.2 | 249 |
| Do | Ammonia | 1.3 | 250 |

[1] Red fuming nitric acid.

TABLE 2
*High Energy Bi-Propellants*

| Oxidizer | Fuel | Oxidizer/fuel ratio (by Weight) | $I_{sp}$ sec. at 300 p.s.i.a. |
|---|---|---|---|
| 70% O$_2$, 30% O$_3$ | JP-4 | 2.3 | 253 |
| 30% O$_2$, 70% O$_3$ | JP-4 | 2.1 | 259 |
| 100% O$_3$ | JP-4 | 1.9 | 266 |
| 100% O$_3$ | Ammonia | 1.13 | 267 |
| 100% O$_3$ | Hydrazine | 0.63 | 277 |
| Fluorine | JP-4 | 2.6 | 265 |
| Do | Ammonia | 2.6 | 288 |
| Do | Diborane | 5.0 | 291 |
| Do | Methanol | 2.37 | 296 |
| Do | Hydrazine | 1.98 | 293 |
| Do | Hydrogen | 4.5 | 252 |
| 100% O$_3$ | do | 2.3 | 369 |

The liquid oxygen-ethanol combination was used in the German V-2 bomb in World War II. The ratios of oxidizer to fuel and the specific impulses are shown for each combination. It will be noted that the specific impulses of the liquid combinations in Table 1 are in the range of about 220–250 seconds which is considered to be comparatively low.

In Table 2 are shown a series of liquid bi-propellant combinations of higher energy output having specific impulses of about 250–370 seconds. These high energy fuel combinations are, from the standpoint of available energy, much more to be desired than the current fuel combinations.

As a background to the description of this invention and to demonstrate the advantage in using a propellant with increased specific impulse, the basic equation of rocketry may be used:

$$\frac{M_o}{M_c} = e^{\frac{V_1}{V_2}} = e^{\frac{V_1}{I_{sp}} \times g}$$

Where
$M_o$ is the initial mass of the rocket,
$M_c$ is the mass of the rocket after the fuel is burned,
$V_1$ is the velocity of the rocket,
$V_2$ is the exhaust or jet velocity,
$I_{sp}$ is the specific impulse,
$g$ is the normal acceleration of gravity or 32.2 ft./sec.$^2$, and
$e = 2.72$, base of natural logarithms.

If one desired to orbit a satellite around the earth at a velocity of 18,000 miles per hour or 5.00 miles per second, using a propellant of say 200 seconds specific impulse, the rocket motor exhaust velocity produced would equal 200 seconds times $g$; or 6440 ft./sec., or 1.22 miles per second. The ratio of the original mass of the rocket to its cutoff mass, i.e. the remaining mass after the fuel had been completely consumed, would be $$\frac{M_o}{M_c} = e^{\frac{5.00}{1.22}} = e^{4.10} = 60.3$$

Thus, in order to place one ton in orbit using this propellant the ideal initial mass of the rocket, or $M_o$, would have to be at least 60.3 tons or 59.3 tons of propellant.

On the other hand taking a propellant having a specific impulse of say 400 seconds, the ratio of $M_o$ to $M_c$ would be $$e^{\frac{5.00}{2.44}} = e^{2.05}$$

or 7.77 tons initial mass, of which 6.77 tons represents fuel plus oxidizer. Thus, doubling the specific impulse does not merely double the pay load but increases it by a far greater factor, in this case more than eight times.

One of the reasons that presently used solid fuel combinations have comparatively low specific impulses (most of them are below the liquid combinations shown in Table 1), resides in the fact that a considerable part of the oxidizer is "ballast." Thus, for example, 45% by weight of the $NH_4ClO_4$ molecule serves merely as a carrier for oxygen, and contributes nothing to the energy released. It actually consumes energy in that it must be carried aloft.

There are many oxidizer-fuel combinations which are not subject to this disadvantage. Thus, fluorine and hydrogen react completely to form hydrogen fluoride. Many oxidizers are completely unstable at room temperature and/or in the liquid form, but are stable in solid form. This invention takes advantage of the stability of such solids and thereby makes available for use oxidizer and fuel combinations which are capable of delivering high energy but which either cannot be used at present, or if used as bi-propellant liquids present an extreme safety problem, to say nothing of the disadvantages of liquid propellants discussed earlier. In Table 3 is a list of such oxidizers and also fuels, together with their melting points.

TABLE 3

| Oxidizer | Melt. Point, °K. | Fuel | Melt. Point, °K. |
|---|---|---|---|
| $N_2O_5$ | 314 | LiH | 953. |
| $Cl_2O_6$ | 296.7 | $Li(BH_4)$ | 551. |
| $N_2O_4$ | 262.2 | $NH_4F$ | Subl. @ 373. |
| $ClO_2$ | 214 | $B_{10}H_{14}$ | 372.5. |
| $ClF_3$ | 190.6 | $Be(BH_4)_2$ | 364.5 subl. @ 760 mm.Hg. |
| $Cl_2O_7$ | 181.7 | $N_2H_4$ | 274.7. |
| $ClO_2F$ | 158 | $(CN)_2$ | 245.4. |
| NOF | 140.7 | $B_5H_9$ | 226.41. |
| $ClO_3F$ | 127 | $B_6H_{10}$ | 208.1. |
| $O_2F_2$ | 109.7 | $NH_3$ | 195.40. |
| $NO_2F$ | 107 | $B_4H_{10}$ | 152.4. |
| $ClO_4F$ | 105.9 | $n-C_4H_{10}$ | 138.2. |
| $O_3$ | 80.7 | $B_2H_6$ | 108.30. |
| $O_3F_2$ | ≃77 | $C_2H_4$ | 103.72. |
| $NF_3$ | 64.7 | $CH_4$ | 90.68. |
| $F_2$ | 55.2 | $C_2H_6$ | 89.93. |
| $O_2$ | 54.32 | $C_3H_8$ | 85.51. |
| $OF_2$ | 49.3 | $H_2$ | 13.92. |

It will be noted that none of the fuels and none of the oxidizers will burn by themselves as will nitrocellulose or ammonium perchlorate, for example, the latter being well known explosives and rocket fuel components.

It will also be noted that no components of either the fuels or oxidizers serve as "ballast." The combinations we use undergo complete interaction with all components reacting to release energy without a "dead weight" component such as that of ammonium perchlorate referred to above.

It is understood that any combination of the listed oxidizers and fuels may be employed in frozen form in this invention. Mixtures of more than one oxidizer or of more than one fuel may also be used. The list is intended to be illustrative and not to limit the invention to the compounds shown or to the possible combinations thereof.

The materials should have the property of being converted from the solid phase to a fluid phase by the heat of the flame at such a rate as to continuously supply a combustible mixture of the oxidizer and fuel to the flame, thus keeping it self-sustaining. In most instances there is probably a thin layer of liquids formed on the surface adjacent the flame, which liquids tend to mix and then quickly vaporize with further mixing, followed by burning. In this way the flame is fed with a continuous supply of combustible vapors which burn at the same rate they are supplied. In some other cases vaporization may occur directly as by sublimation. In any event the oxidizer and the fuel which are present in the body as separate entities, i.e. as contiguous masses, must intermingle sufficiently under the action of the flame to provide a combustible mixture at a continuous and substantially uniform rate. The main body of the fuel-oxidizer combination remains in frozen form behind the burning face.

Figure 2:
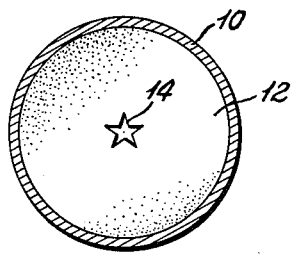

FIGURE 1 is a fragmentary section of a rocket showing the fuel in place. FIGURE 2 is a section along the lines 2—2 of FIGURE 1. Both are diagrammatic representations of a fuel body designed to burn from the inside toward the outside of the body.

FIGURES 3 to 8 represent diagrammatically several forms or shapes of the oxidizer elements and fuel elements when viewed from the surface to be burned. In this case burning would be initiated at the surface adjacent the nozzle of the rocket motor and burn progressively toward the other end of the body.

The terms "propellant body," "fuel body," "composite body," and "fuel grain" are synonymous as used herein.

These bodies are made up of "fuel elements" and "oxidizer elements."

The "fuel elements" or "fuel components" are the individual bodies of frozen fuel, and the "oxidizer elements" or "oxidizer components," are the individual bodies of frozen oxidizer, which are juxtaposed to form "composite body" or "sandwich" as illustrated in the appended drawings.

Referring to FIGURE 1 a vertical section of the rocket motor shell or fuel chamber is shown at 10. It has a nozzle 11 through which thrust gases escape. The propellant body is made up of alternating layers such as disks of frozen oxidizer 12 and frozen fuel 13, these filling the chamber. The composite body may be maintained in place by means used for present solid rocket fuels. Such means are known and form no part of the novelty of this invention. Instead of disks the elements may be in other shapes extending more or less radially from the center to the sides of the body, but for this particular modification the "sandwich" of alternating disks is conveniently used.

Through the center or longitudinal axis of the composite body is provided a tubular opening 14 of any desired cross-sectional shape. It is shown as a star, but other shapes may be used. The solid surfaces forming the tube is the burning surface when the charge is ignited. The shape of the opening is dependent upon the desired rated of burning. Thus, a star shape opening provides more surface than a cylindrical opening. The body will burn more quickly with the former than the latter shape. This is also well understood in rocketry and no claim of novelty is made with respect to it.

Figure 3:
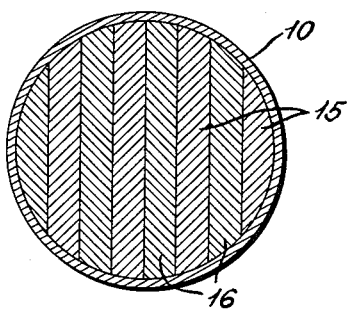
Figure 4:
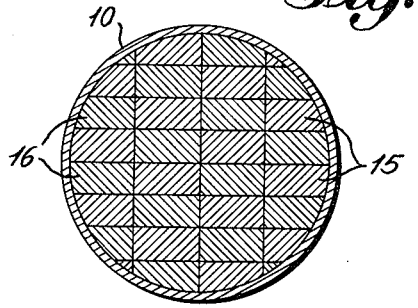
Figure 5:
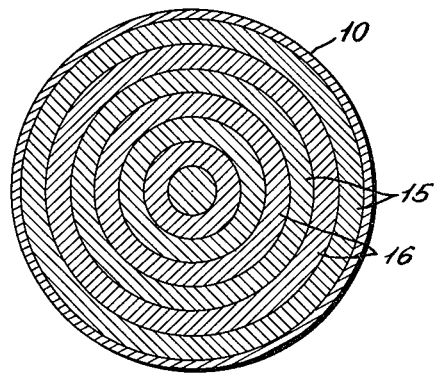
Figure 6:
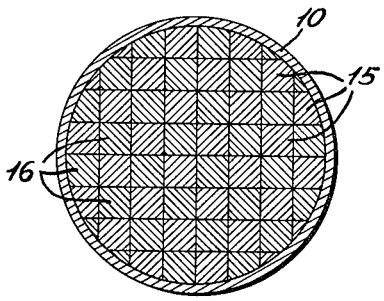
Figure 7:
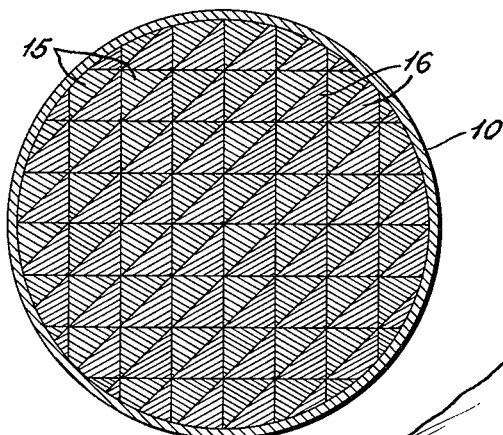

In FIG. 3 is shown a transverse cross-section of a rocket shell 10 in which is disposed a composite propellant body made up of alternating plates of fuel 15 and oxidizer 16. In this case the plates may be elongate. The body is intended to be ignited at the surface presented in the figure, and to burn progressively from this end to the other, the portion of the body behind the flame being maintained in the frozen state.

Figure 9:
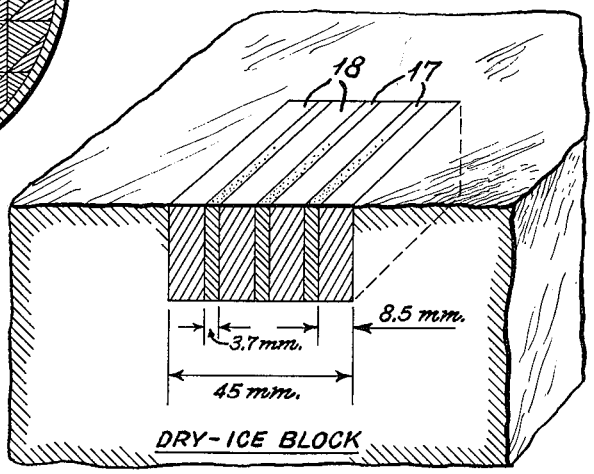

The fuel and oxidizer components formed into other shapes which are juxtaposed to form the composite body, are designated with similar hatching in FIGURES 4 to 8. These are shown as rod-like elements of rectangular, hexagonal or triangular cross-section, or as concentric tubes as will be evident, and detailed description is not necessary. The surface illustrated is that to be ignited. Any shape of elements can be used which will permit the close packing and juxtaposition of the fuel and oxidizer elements, those illustrated being illustrative. The rods, tubes, plates, etc. may be of any length convenient to manufacture, assemble and use. FIGURE 9 is a section of a device used to test the burning characteristics of a fuel-oxidizer combinations.

To describe the invention in one of its simplest forms the propellant body may be made up in the form of a sandwich of alternating layers of solid fuel 12 of FIG. 1 or 15 of FIG. 3, and solid oxidizer 13 and 16 of the same figures. One method of forming these layers making up the sandwich is to solidify the fuel by freezing, and grind it into particles of a size suitable for pressing into compact sheets. The oxidizer is solidified by refrigeration and is likewise comminuted and pressed into compact sheets or plates. A plurality of these sheets are made up separately. The temperature of all of the sheets must be maintained at all times below the melting point of the lowest melting component, whether it be oxidizer or fuel, before the sandwich can be made up. These sheets are then superimposed one upon the other to form the propellant body of the desired size. The composite body can be cut, machined or otherwise formed into a shape suitable to fit snugly into the fuel chamber of the missile. The composite propellant body may be suitably supported within the engine by known means. The chamber can be loaded if desired and the entire mass kept under refrigeration at a temperature to insure that all of the components remain in solid form until they are used. Since a certain amount of time may be consumed in assembling the rocket or missile at the launching pad, it may, under some circumstances, be necessary to provide a refrigeration means to make certain none of the components of the propellant body melt before firing. It may be necessary to provide insulation or other means inside the fuel chamber to prevent melting of the components around the exterior of the body, between the time of firing and the time the propellant is consumed, particularly when using extremely low melting components such as solid fluorine and solid hydrogen.

The alternating segments or layers of fuel and oxidizer body can be juxtaposed directly upon each other or can be separated by thin layers of protective sheets or protective coatings. It is preferable that these layers also act as fuel or oxidizer. For example, the sheets can be very thin sheets of polyethylene, cellophane, paper, etc. which will be combusted by the oxidizer. Protective coatings can be painted on, in a thin film, on either the fuel or oxidizer elements. For example, liquid neopentane ($C_5H_{12}$) or benzene ($C_6H_6$) can be painted on solid hydrazine elements to prevent its rapid or spontaneous reaction with adjacent elements of solid $N_2O_4$. Compounds with functional groups, for example, aniline ($C_6H_5NH_2$), can be used similarly; or mononitro- or polynitro-paraffins are other examples of suitable coating materials.

In some instances, however, particularly for storage over long periods of time, it may be desirable to use chemically inert protective sheets or coatings so as to prevent deterioration due to slow interaction between juxtaposed solid components. These may be, for example, thin sheets of solid polytrifluorochloroethylene or the like, or coatings of solidified greases or solidified oils made by polymerizing such perhalocarbons.

Instead of forming the elements from pressed powders as described, they may be cast into the various forms. In this case the liquified oxidizer (or fuel) may be cooled to a point just above its freezing point, or may be supercooled, and poured into molds and frozen. The molds may be removable or may be of a combustible material such as thin walled polyethylene or other synthetic resin or polymer, or may be paper, etc. In such cases the frozen oxidizer and fuel elements encased in the molds can be packed in juxtaposition to form the composite body as described, the temperature being maintained below the freezing point of the lowest melting component.

Figure 8:
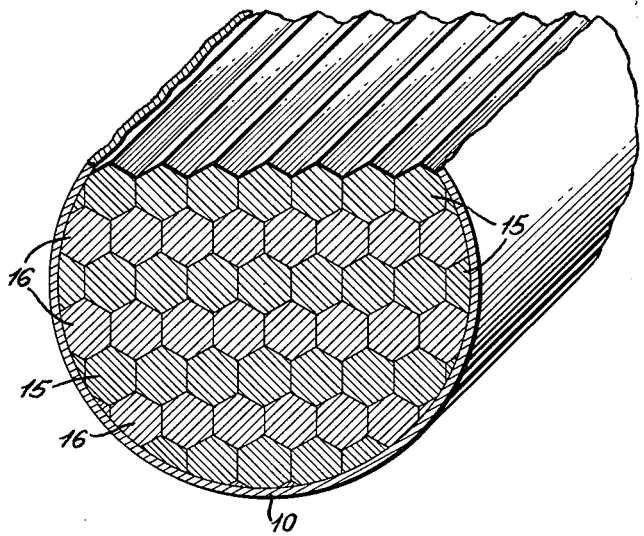

Similarly a composite mold may be made up of combustible material, say in the honeycomb arrangement of FIG. 8. One of the components, e.g. the oxidizer, is poured into the compartments as indicated in the figure and is frozen. If this is the highest melting component, the temperature is then reduced and the fuel component poured into the compartments it is to occupy and similarly frozen. In the case of large rockets, the total amount of heat in the chamber after firing, and the turbulence set up may permit the use of elements of larger cross-section since these factors assist in mixing the surface layer of molten and vaporized oxidizer and fuel. This method may be particularly desirable in preparing propellants for such rockets.

In use, the propellant body is placed in the fuel chamber of the missile with a burning face presenting the juxtaposed solid fuel and oxidizer elements in a manner as illustrated in FIGURES 1 to 8. The fuel is ignited by any of the usual means such as a flame, a hot resistance element, spark discharge (spark plug) squid, electric arc, or the like. When the ignition means is applied to the face of the propellant body which is to be burned, the solid oxidizer and solid fuel may first melt at the exposed face and then vaporize. Some may vaporize directly. The melting and vaporization occurs only at the face of the propellant body. Since the components illustrated are pure compounds with a sharp melting point they form mobile liquids which quickly intermingle. Further mixing of the vapors takes place to form what approaches an ideal combustible mixture. The vapors are immediately burned. The heat of combustion continuously melts and vaporizes additional fuel and oxidizer but only at the burning surface, and only as rapidly as they are consumed. Thus, the burning progresses at a controlled and uniform rate until all of the propellant has been burned.

In contrast to this "sandwiches" were made up of alternating layers of normally solid fuels and oxidizers. The blocks were about 5.7 x 2.0 x 3.5 cm.

In one case the block consisted of three layers of paraffin wax (M.P. about 60° C.) and two alternating layers of ammonium nitrate. Each layer was 4 mm. thick. A gas flame was applied to an end surface in an attempt to initiate combustion. Melting occurred, but no sustained burning.

In another experiment a layer of ammonium nitrate, 10 mm. thick, was sandwiched between two layers of paraffin each 4 mm. thick. Both components melted when a flame was applied, but there was no burning.

In still another case camphor was substituted for the paraffin of the preceding example. The camphor caught fire (in the air) and the ammonium nitrate melted in the flame. There was no combustion of camphor and ammonium nitrate.

In addition, tests were made with hexamethylene tetramine and naphthalene as fuels, and potassium perchlorate, potassium chlorate, and ammonium perchlorate as oxidizers. With the latter, paraffin burns with ammonium perchlorate, because that oxidizer will burn by itself. The other oxidizers would not support combustion. This is in contrast to examples of this invention set forth in detail below.

The relative size of the fuel and oxidizer elements are determined by the amount of oxidizer required to burn all of the fuel and by the relative densities of the oxidizer and fuel elements. The arrangements shown in FIGURES 1–8 illustrate an idealized situation in which equal weights of fuel and oxidizer of equal density are used. Of course, this does not represent the actual case in most instances. Thus, if a sandwich type propellant body, such as is illustrated in FIGURE 1, employed an oxidizer which in order to oxidize all of the fuel present would occupy a volume twice that of the volume occupied by the fuel, the oxidizer segments would, therefore, be twice as wide as the fuel segments. The relationship becomes apparent from a consideration of densities of the materials involved, and the stoichiometric quantity of the two component elements. Although the mixing at the burning face is efficient, it may sometimes be desirable to have some excess of oxidizer or fuel.

The dimensions of the smallest transverse cross-section of the individual elements may vary over a considerable range. The only limitations with respect to this resides in the efficiency of mixing of the melted and vaporized fuel and oxidizer at the burning face to form a combustible mixture. Obviously, if the dimension is too great, the efficiency of mixing will be impaired so that incomplete reaction might occur with a resultant waste of fuel, or may even result in the flame being extinguished. We have used segments in a sandwich type body which were approximately ¼" wide in the smallest transverse direction. The components might be of smaller dimensions or, in some instances, larger. The nature of the propellant and/or fuel may enter into the choice of thickness but in the last analysis it is the degree of mixing which is the most important consideration. From a practical standpoint, the elements should be as thick as is consistent with efficient mixing, since this would reduce the number of individual elements and make for easier and more rapid assembly of the composite body.

The dimension depends in part upon the pressure developed within the combustion chamber during burning. The following ranges are illustrative:

| Pressure, Atm. | Transverse Thickness, mm. | Preferred Thickness, mm. |
|---|---|---|
| 1 | 0.1–12 | 5–10 |
| 10 | 0.1–25 | 5–20 |
| 50 | 0.2–50 | 5–40 |

If the layers are too thin, burning may be too rapid to the point of detonation, particularly as the pressure increases. If they are too thick, they will not melt and mix sufficiently to support combustion. As will be noted, the permissible thickness of the layers increases with increase in pressure developed within the engine.

As to the length of the segments, this is not important except from a practical standpoint. Obviously a body could be made up in which the length of the segments corresponded to the length of the fuel chamber of the missile. As a practical matter, since the missiles are frequently quite long, a plurality of shorter blocks could be made up and inserted one at a time until the fuel chamber is charged.

As an example of a solid propellant combination, butane may be taken as a fuel and dioxygen difluoride ($O_2F_2$) as the oxidizer. Both are gases at room temperature. The dioxygen difluoride is unstable at room temperature, and decomposes completely into oxygen and fluorine. In liquid form it is also subject to decomposition. On the other hand, it can be readily converted into a stable solid by freezing below a temperature of about 109.7° K. Butane freezes at a temperature below 152.4° K. as may be seen from Table 3. The amount of energy liberated according to the following equation, equals 312.5 Kcal. at 25° C.

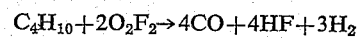

$$C_4H_{10} + 2O_2F_2 \rightarrow 4CO + 4HF + 3H_2$$

These propellant elements can be made into a composite body such as a sandwich or other form of solid propellant body by forming the separate shapes as described. The body can be held together by straps imbedded in grooves, or by means of a thin walled cylindrical jacket of metal or combustible materials, or by any suitable means.

In a rocket chamber at 20 atmospheres, i.e. 300 p.s.i. pressure, and starting with the solid ingredients in the form described herein, the solid butane, solid dioxygen difluoride propellant will produce a temperature of 3350° K. with the molecular weight of the combustion gases being 17.6. The specific impulse is 265 seconds and the exhaust velocity of the jet is 8600 feet/second. As this example shows, the performance of this solid propellant body would be substantially better, not only than present solid propellants but also better than the usual type of liquid bi-propellants shown in Table 1. This propellant may be considered as definitely of the high energy type and has a specific impulse equal to or greater than some of the high energy propellants shown in Table 2.

While the butane-dioxygen difluoride combination might possibly be used as a bi-propellant liquid system using separate tanks of liquid butane and of liquid dioxygen difluoride, such a system requires the use of tanks, pumps, pipes, fittings, control devices, etc. which in addition to presenting possible mechanical difficulties, occupy space and are dead weight. By using these components in the form of the solid propellant of this invention, the unproductive volume and weight of bi-propellant liquid systems is eliminated. The fuel load for missiles or rockets of a given size is increased. The ratio of pay load, such as a warhead or instrumented satellite, to the necessary dead weight required to transport the pay load to its destination is much more favorable in the case of the solid propellant of this invention than it is in the case of the liquid system, even through the specific impulses of the two fuels are about the same.

There is a further advantage in the use of the solid propellant of this invention over and above using the same system in a bi-propellant liquid system. The density of both the usable fuels and oxidizers in the solid state are substantially greater than the density of the same fuel or oxidizer in the liquid state. For example, the density of solid benzene (which may be used as a fuel) is 1.02 at −3° C. and is 1.14 at − 195° C. The density of liquid benzene at 20° C. is only 0.872.

Similarly, to give an example of an oxidizer, the density of liquid oxygen at its normal boiling point 90.3° K. is 1.142 gm./cc., whereas, the solid forms of oxygen (alpha, beta or gamma) have substantially greater densities. Alpha or rhombic oxygen has a density of 1.462 gm./cc. This increase in density of the solid bi-propellant over the liquid bi-propellant means that for a given fuel tank or chamber volume, a greater weight of the propellant of this invention can be charged than for the corresponding liquid bi-propellant.

It might be believed that a substantial amount of energy in the form of heat would be lost in heating, fusing and vaporizing the components, particularly when propellant combinations are used which require very low temperatures to keep them in the solid state. The amount of heat thus lost in actuality is insignificant (of the order of about 5% or less) as may be shown by the following example.

One of the most potent mixtures which could be formed into a sandwich or the like, is solid hydrogen and solid fluorine. If the sandwich were prepared in ratios in accordance with the following equation, the amount of heat evolved at 25° C. is 128 Kcal. per 2 mols of HF.

$$H_2 + F_2 = 2HF$$

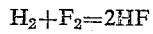

The heat content between zero degrees K. and room temperature (about 298° K.) is only 2.0 Kcal. per mol for hydrogen and 2.1 Kcal. per mol of fluorine. The total loss by cooling these two substances from room temperature to absolute zero would be only 4.1 Kcal., or in other words, only 3.3% less than the amount of heat given off at room temperature. Since if hydrogen and fluorine were to be used in a bi-propellant liquid system there would still be a certain amount of loss of heat due to the vaporization and heating of the liquids, the actual difference in heat loss as between the two systems would be somewhat less than this. Thus, the specific impulse of the solid combination would be only slightly below the specific impulse of the gaseous or liquid systems, which is around 350 seconds.

Even though the components of the present propellant are cooled considerably below their melting points, the loss of available energy is a very small fraction, usually less than 5%, of the total heat of combustion. It does not take them out of the class of high energy fuels with which we are primarily concerned. The invention can also be used with the lower energy present day oxidizer-fuel combinations such as are shown in Table 1.

The gain in performance due (*a*) to the increased volumetric efficiency of a solid-fuel rocket, and (*b*) to the increased amount of fuel which may be carried in a rocket of a given size due to the increase in density of the solid over its liquid counterpart, more than offsets the small loss of energy due to the heat content of our propellant fuel system.

Moreover, as previously mentioned, a large variety of the high energy combinations can be used which heretofore could not because of the poor thermal stability of the ingredients and the acute danger of inducing explosion or detonation of the liquid form. The instability of dioxygen difluoride has already been mentioned. Similarly $N_2O_5$ is unstable at room temperature but is stable as a solid at −78° C. Many of the boron hydrides are unstable at room temperature but are stable as solids. Liquidozone fluoride $O_3F_2$ begins to decompose above the boiling point of oxygen or fluorine, but is stable as a solid.

The presently used solid bi-propellants are intimate mixtures of grains of the oxidizer with the fuel. As the rocket engineer in seeking to increase performance of solid fuels, prepares systems of greater and greater energy potential, the point is reached where the solid propellant is extremely dangerous to handle. On the other hand, by means of the present invention, highly powerful chemicals can be placed in juxtaposition as solid bodies without danger of explosion or detonation or of accidental ignition as long as they are kept in the solid state.

The surface of the body at which ignition is to be initiated may be a transverse section of the body and may be cut or otherwise treated to provide a smooth surface. If it is desirable to increase the surface area at which burning is to occur, this can be done in the manner presently used for solid propellants. A channel of circular shape, star shape, or the like, is cut axially through the propellant body. In this case the contiguous fuel and oxidizer elements are arranged more or less radially or as alternating disks as shown in FIG. 1. Thus, the fuel burns from the inside outwardly instead of from one end to the other. Such an expedient increases the amount of fuel which can be burned per unit of time over longitudinal burning.

When burning of either type body is initiated it proceeds over the entire exposed surface in a regular and uniform manner until the entire body has been consumed by the progressive burning.

The only place at which the combined chemicals are present as an explodable mixture, namely, mixed liquid or mixed vapor is at or adjacent the burning surface and the amount present is small. It is consumed before dangerous quantities can accumulate. The rate of burning is much more rapid than the rate of heat transfer into the solid body other than at the immediate surface where sufficient melting occurs to provide a continuous supply of the combined chemicals making the flame self-sustaining.

Since, as a rule, at least one of the solid elements and preferably both are normally gaseous or are rather low boiling liquids, and since the flame temperature is far above the melting point of either component, the burning is uniform over the entire surface and continues progressively. This is unlike what would occur if a body were to be made up of elements of high melting normally solid chemicals such as form the components of present day solid propellants. These have such high melting points that no mixing of the solid elements could occur and consequently if such a body were ignited it would soon extinguish itself. Present day solid propellants have to be used as mixtures of grains of the fuel and oxidizer constituents, and are not operable in the present invention. This has been illustrated earlier in the specification.

The progressive burning, which in somewhat over-simplified language might be said to resemble the progressive burning of a candle, eliminates the problems encountered with the complex mechanisms required of liquid propellant systems, since no pumping or careful adjustment of fuel flow and oxidizer flow is required. This adjustment is made automatically by choosing and proportioning the frozen components in the propellant body so that when melted by the heat of the flame they mix in the proper proportions to provide maximum burning efficiencies. Many of the mishaps in the present day missiles and rockets propelled by liquid propellants are attributed to mechanical malfunctioning which can be eliminated by the use of solid propellants. Mishaps with present day solid propellants due to the dangerous and frequently explosive combinations of oxidizer and fuel is eliminated by the safety features built into the solid propellant body of this invention.

To demonstrate the usefulness of the invention, the manner in which burning occurs and the fact that only the immediate surface of the body is melted and vaporized, three systems were tested, (1) nopentane gas ($C_5H_{12}$) and nitrogen dioxide gas ($NO_2$), (2) liquid benzene and nitrogen dioxide gas, and (3) hydrazine, $N_2H_4$, and nitrogen dioxide gas. In the first two instances the fuels were frozen and then ground to a powder under refrigeration. The powders were separately sieved at a temperature below the melting point to about 50 mesh size to provide uniformity and to provide powders which would be readily compressed to dense cakes. The powders were then separately compressed into plates at a temperature below the melting point using a standard hydraulic press and mold at a pressure of 9000 p.s.i. and at a temperature below the mleting point. Both were maintained at a temperature below the melting point of either at all times. This operation is entirely safe from the sandpoint that neither detonation nor explosion can occur since the fuel and oxidizer are kept separate and as long as it is carried out below the melting point of the materials. In the case of noxious or poisonous gases or liquids, the usual precautions must be taken for the protection of the operator.

In the third case, i.e., $N_2H_4$ and $N_2O_4$, the fuel and oxidizers were poured as liquids into shallow trays and solidified by freezing.

The plates of fuel and oxider were then arranged in a multi-layer sandwich pattern and were placed in a rectangular hollow which had been cut in a block of Dry Ice, as shown in FIGURE 9. The fuel is represented by the shaded areas 17 and the solid oxidizer plates by the shaded areas 18. The size of the block and of the plates is indicated in FIGURE 9. The upper or burning surface of the sandwich was flat and smooth. This can be achieved by sawing, filing or otherwise cutting.

The surface was ignited by means of a small city gas flame brushed over it. Once ignited, the burning proceeded vigorously and smoothly. The flame was blown out after the burning had proceeded about half way through the block. Examination of the surface showed that the alternating plates of oxidizer and fuel were still intact and well defined in the unburned portion. In these particular experiments a greater amount of fuel burned near the center than toward the outside leaving a cone shaped hollow as might be expected under the circumstances. This was due to the intense cold of the Dry Ice which slowed down the melting of the oxidized immediately in contact therewith. The material in contact with the Dry Ice was large in proportion to the mass of the entire sample. Such an effect would not occur in the fuel chamber of a rocket since in a large mass such as would be present in a rocket the heat would be so intense that such an effect would not occur.

Complete combustion of benzene with nitrogen dioxide proceeds according to the following equation:

$$C_6H_6(18.5\%) + 7.5NO_2(81.5\%) \rightarrow 6CO_2 + 3H_2O + 3.75N_2$$

According to the above equation, one gram of benzene requires 4.42 grams of nitrogen dioxide for complete oxidation. The density of solid nitrogen dioxide is 1.96 and that of solid benzene is 1.02. From this ratio of the area of the fuel to the area of the oxidizer at the burning surface can be calculated according to the following equation:

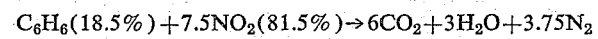

or, in the above specific case:

$$\frac{(4.42:1.96)}{(1.00:1.02)} = 2.30$$

Thus, in the case of the benzene-nitrogen dioxide system the surface ratio is 1:2.3. Since the length and depth of both elements are identical, the thickness of each of elements is in this ratio. For example, if the thickness of the benzene plates were 5 mm., the thickness of the solid nitrogen dioxide would be 11.5 mm. The surface ratio of other systems can be calculated in a similar manner.

Thus, once having determined the correct surface ratio, the thickness of the fuel elements and of the oxidizer elements can be determined, based upon considerations of conditions under which the most efficient mixing of the components occurs in the liquid and vapor layer adjacent the burning surfaces. As noted, the plurality of elements are arranged in contiguous relationship, preferably in a regular pattern.

The sandwiched system of solid neopentane-nitrogen dioxide burned at one atmosphere pressure and initial temperature of $-78°$ C. with a velocity of 0.6 cm./min. It should be pointed out that in the apparatus and method employed in the laboratory when making these experiments, the sandwiches were not made in the exact ratio of fuel to oxidizer as indicated by the equation or by the ideal ratio calculation. The benzene made up about 30% by weight and the nitrogen dioxide about 70% by weight of the entire body.

Obviously the weight ratio of fuel to oxidizer can be changed over a wide range by suitable changing of the area ratio. Thus either a fuel rich or oxidizer rich propellant body can be made.

To compare the performance of the sandwiched type body with the burning rate of an ideal stoichiometric mixture of the liquid fuel and liquid nitrogen dioxide (which is not within the scope of this invention) such a solution was made up and frozen into a block at $-78°$ C. and burned in a hollow cut in a block of Dry Ice. The burning rate in this system was about 1 cm./min.

This shows that even in the rather crude embodiment described, the rates of burning of the sandwich and the ideally mixed solids, were not far apart, being 0.6 cm./min. as compared with 1.0 cm./min. Had the sandwich been more nearly in stoichiometric proportions, the burning rates may well have compared even more favorably.

A third example was the combustion of sandwiches of solid hydrazine ($N_2H_4$) and solid nitrogen dioxide. This is a very sensitive and fast burning mixture. Liquid hydrazine ignites spontaneously when it comes in contact with liquid $N_2O_4$. Even at $-78°$ C. clean solid surfaces of $N_2H_4$ and $N_2O_4$ react and ignite when placed in juxtaposition to each other.

However, very thin sheets of polyethylene, i.e., $(CH_2)_n$, prevent reaction if placed between the solid hydrazine and $N_2O_4$.

A solid sandwich combination was built to correspond to the equation:

$$2N_2H_4 + N_2O_4 \rightarrow 4H_2O + 3N_2$$

It burns very vigorously and smoothly when ignited by a flame or even a metal blade. The burning velocity at 1.0 atmospheric pressure, at an initial temperature of the solid at $-78°$ C. is 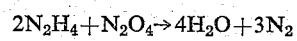 3.0 cm./min.

The burning velocity of the system is increased at a rate usually directly proportional to the pressure at which the burning occurs. Thus, at 20 atmospheres pressure, the burning velocity of the benzene, nitrogen dioxide sandwich system would be about 12 cm./min. using the proportions employed in this experiment.

The burning velocities of the mixtures compare favorably with the burning velocities of monopropellants such as ethylene glycol dinitrate, which ranges from about 1.55 cm./min. at zero degrees C. to 2.44 cm./min. at 100° C.; and of nitro-glycerine which burns at a rate of about 0.14 cm./min. at 20° C. to about 0.87 cm./min. at 100° C. TNT burns at a rate of about 0.70 cm./min. at 20° C.

The fuel may be burned with the flame shooting in any desired direction, either vertically upward, vertically downward or at any intermediate angle. Experiments show that when the flame is shot vertically downward, no liquid flowed from the cavity indicating that the fuel is consumed at the surface as rapidly as melting occurs. If excess liquid formed, it would have flowed or dripped off of the surface, or droplets would have formed, which could have extinguished the flame.

We claim:

1. The method of developing and maintaining a continuous thrust at a controlled rate over a period of time which comprises disposing in the combustion chamber of a rocket engine a solid composite propellant grain consisting essentially of a fuel component and an oxidizer component which will not burn by itself, at least one of said components being fluid under atmospheric conditions, said composite grain consisting essentially of a plurality of frozen solid fuel bodies and frozen solid oxidizer bodies, each of which is shaped to provide matching surfaces, said fuel bodies and said oxidizer bodies being juxtaposed with at least one matching surface of each fuel body being contiguous with a matching surface of an adjacent oxidizer body to form said composite propellant grain, said fuel bodies and oxidizer bodies being arranged so as to provide an exposed surface which is a transverse cross-section of said composite grain, said exposed surface comprising alternating fuel bodies and oxidizer bodies, and being the surface at which combustion occurs upon ignition of the grain, said fuel and oxidizer components being convertible when ignited and under the influence of the heat of combustion, to a thin fluid layer, igniting the grain at an exposed surface within said combustion chamber to form a self-sustaining flame which converts fuel and oxidizer elements at the ignited surface into a thin fluid layer to continuously supply the flame with a combustible mixture of the materials making up said bodies, said propellant grain being at a temperature such that the frozen components remain in solid form except at the ignited surface, progressively burning the propellant grain until it is substantially completely consumed while continuously ejecting the combustion products from said reaction zone to produce a continuous thrust at a controlled rate.

2. The method of claim 1 wherein the oxidizer component is a frozen solid material which is a liquid at atmospheric conditions.

3. The method of claim 1 wherein the oxidizer component is a frozen solid material which is a gas at atmospheric conditions.

4. The method of claim 1 wherein the fuel component is a frozen solid material which is a liquid at atmospheric conditions.

5. The method of claim 1 wherein the fuel component is a frozen solid material which is a gas at atmospheric conditions.

6. The method of claim 1 wherein the smallest transverse dimension of the fuel and oxidizer bodies is within the range of about 0.1 to about 50 mm. where the pressure developed within the combustion zone is from about 5 to about 75 atmospheres.

7. In combination with a vessel forming a rocket engine combustion chamber, a solid composite propellant grain consisting essentially of a fuel component and an oxidizer component which will not burn by itelf, at least one of said components being fluid under atmospheric conditions said composite grain consisting essentially of a plurality of frozen solid fuel bodies and frozen solid oxidizer bodies, each of which is shaped to provide matching surfaces, said fuel bodies and said oxidizer bodies being juxtaposed with at least one matching surface of each fuel body being contiguous with a matching surface of an adjacent oxidizer body to form said composite propellant grain, said fuel bodies and oxidizer bodies being arranged so as to provide an exposed surface which is a transverse cross-section of said composite grain, said exposed surface comprising alternating fuel bodies and oxidizer bodies, and being the surface at which combustion occurs upon ignition of the grain, said fuel and oxidizer components being convertible to a thin fluid surface layer when ignited and under the influence of the heat of combustion.

References Cited in the file of this patent

UNITED STATES PATENTS

| 1,074,809 | Newton | Oct. 7, 1913 |
| 1,680,873 | Girardville | Aug. 14, 1928 |
| 2,265,110 | Brauer | Dec. 2, 1941 |
| 2,408,252 | De Ganahl | Sept. 24, 1946 |
| 2,759,418 | Ross et al. | Aug. 21, 1956 |
| 2,926,613 | Fox | Mar. 1, 1960 |
| 2,938,359 | Cobb et al. | May 31, 1960 |
| 2,939,275 | Loedding | June 7, 1960 |
| 2,955,032 | Osborg et al. | Oct. 4, 1960 |
| 2,978,308 | Keller | Apr. 4, 1961 |

FOREIGN PATENTS

| 476,227 | Great Britain | Dec. 3, 1937 |